US007243090B2

(12) United States Patent
Kinzhalin et al.

(10) Patent No.: US 7,243,090 B2
(45) Date of Patent: Jul. 10, 2007

(54) SYSTEM AND METHOD FOR SPECIFICATION TRACKING IN A JAVA COMPATIBILITY TESTING ENVIRONMENT

(75) Inventors: Arzhan I. Kinzhalin, St. Petersburg (RU); Andrey Y. Chernyshev, St. Petersburg (RU); Mikhail Gorshenev, Mountain View, CA (US); Debra Dooley, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 674 days.

(21) Appl. No.: 09/881,822

(22) Filed: Jun. 14, 2001

(65) Prior Publication Data

US 2002/0198868 A1 Dec. 26, 2002

Related U.S. Application Data

(60) Provisional application No. 60/292,185, filed on May 18, 2001, provisional application No. 60/291,670, filed on May 16, 2001.

(51) Int. Cl.
*G06F 17/30* (2006.01)
(52) U.S. Cl. .......................................................... 707/3
(58) Field of Classification Search .................... 707/3, 707/102, 501.1, 1, 2, 10, 104.1, 200; 709/217; 714/37, 38, 46; 704/3
See application file for complete search history.

(56) References Cited

U.S. PATENT DOCUMENTS

| 5,335,342 | A | * | 8/1994  | Pope et al. ............... 714/38 |
| 5,581,696 | A |   | 12/1996 | Kolawa et al. ............. 714/38 |
| 5,675,729 | A | * | 10/1997 | Mehring .................... 714/37 |
| 5,805,795 | A | * | 9/1998  | Whitten ..................... 714/38 |
| 5,826,025 | A | * | 10/1998 | Gramlich ................... 709/217 |
| 5,850,631 | A | * | 12/1998 | Golshani et al. .......... 707/102 |
| 5,892,947 | A | * | 4/1999  | DeLong et al. ............ 717/100 |
| 5,911,041 | A | * | 6/1999  | Schaffer .................... 714/38 |
| 5,954,826 | A | * | 9/1999  | Herman et al. ............ 714/46 |

(Continued)

OTHER PUBLICATIONS

J. De Raeve and S. McCarron: "Automated Test Generation Technology" ADL Project Report, 'Online! 1997, pp. 1-36, XP002251367 The Opengroup Website Retrieved from the Internet: URL:http://adl.opengroup.org/documents/Archive/adl10rep.pdf retrieved on Aug. 14, 2003! p. 2, col. 1, line 10 p. 7-p. 13.

(Continued)

*Primary Examiner*—Etienne P LeRoux
(74) *Attorney, Agent, or Firm*—Martine Penilla & Gencarella, LLP

(57) ABSTRACT

An invention is disclosed for collecting information on a specification of a computer program. A plurality of classes is provided, where each class is capable of performing a particular task related to obtaining information from a specification. Then a command is received from a user. The command requests a particular task to be performed. A class is then selected from the plurality of classes based on the task requested by the received command, and the selected class is run. In this manner, information on the specification is obtained. The plurality of classes can include a get assertion class that obtains assertions from the specification, and a reporting class that provides information on test coverage of the specification.

12 Claims, 9 Drawing Sheets

U.S. PATENT DOCUMENTS

| | | | |
|---|---|---|---|
| 6,041,330 A | 3/2000 | Carman et al. ............. | 707/101 |
| 6,212,677 B1 | 4/2001 | Ohkubo et al. ............. | 717/143 |
| 6,321,376 B1 | 11/2001 | Willis et al. ................ | 717/124 |
| 6,332,211 B1 | 12/2001 | Pavela ........................ | 717/130 |
| 6,598,015 B1* | 7/2003 | Peterson et al. ............... | 704/3 |
| 2002/0062477 A1 | 5/2002 | Sasaki ........................ | 717/136 |
| 2002/0089526 A1* | 7/2002 | Buxton et al. ............. | 345/700 |
| 2002/0138510 A1* | 9/2002 | Tan ........................ | 707/501.1 |
| 2002/0198868 A1 | 12/2002 | Kinzhalin et al. ............. | 707/3 |

OTHER PUBLICATIONS

Hiroyuki Seki et al: "A Method for Translating Natural Language Program Specifications into Algebraic Specifications" Systems & Computers in Japan, Scripta Technica Journals. New York, US, vol. 23, No. 11, 1992, pp. 1-16, XP000380833 ISSN: 0882-1666 p. 1, col. 1, line 1-p. 5, col. 2, line 1.

Microsoft Press Computer Dictionary Third Edition, p. 28 (1997).

* cited by examiner

SYSTEM AND METHOD FOR SPECIFICATION TRACKING IN A JAVA COMPATIBILITY TESTING ENVIRONMENT

CROSS REFERENCE TO RELATED APPLICATIONS

This application claims the benefit of (1) U.S. Provisional Patent Application having Ser. No. 60/291,670, filed on May 16, 2001, entitled "System and Method for Compatibility Testing in a Java Environment," and (2) U.S. Provisional Patent Application having Ser. No. 60/292,185, filed on May 18, 2001, entitled "System and Method for Combinatorial Test Generation in a Compatibility Testing Environment." Each of these provisional patent applications is incorporated herein by reference.

This application is also related to U.S. patent application Ser. No. 09/881,791, filed Jun. 14, 2001, and entitled "System and Method for Automated Assertion Acquisition in a Java Compatibility Testing Environment," which is incorporated herein by reference.

BACKGROUND OF THE INVENTION

1. Field of the Invention

The present invention relates generally to Java testing, and more particularly to automated Java specification tracking in a Java compatibility-testing environment.

2. Description of the Related Art

Currently, Java environments can be categorized into various Java technologies. A Java technology is defined as a Java specification and its reference implementation. Examples of Java technologies are Java 2 Standard Edition (J2SE), Java 2 Enterprise Edition (J2EE), and Mobile Information Device Profile (MIDP). As with most other types of Java software, a new Java technology should be tested to assure consistency across multiple platforms. This testing is generally performed using compatibility testing.

Compatibility testing refers to the methods used to test an implementation of a Java technology specification in order to assure consistency across multiple hardware platforms, operating systems, and other implementations of the same Java technology specification. When this assurance is accomplished by means of a formal process, application developers can then be confident that an application will run in a consistent manner across all tested implementations of the same Java technology specification. This consistent specification-based behavior is a primary function of compatibility testing.

Compatibility testing differs from traditional product testing in a number of ways. Unlike product testing, compatibility testing is not primarily concerned with robustness, performance, or ease of use. The primary purpose of Java compatibility testing is to determine whether an implementation of a technology is compliant with the specification of that technology.

Compatibility test development for a given feature relies on a complete specification and reference implementation for that feature. Compatibility testing is a means of ensuring correctness, completeness, and consistency across all implementations of a technology specification that are developed. The primary goal of compatibility testing is to provide the assurance that an application will run in a consistent manner across all tested implementations of a technology.

To determine if the implementation of a particular Java technology is compliant with the specification for the particular Java technology, technology compatibility kits (TCK) may be used. A TCK is a suite of tests, tools, and documentation that allows an implementor of a Java technology specification to determine if the implementation is compliant with the specification.

A TCK typically includes a Test Harness, defined as the applications and tools that are used for test execution and test suite management, and a TCK Test Suite, which is the composite of the actual test cases in a TCK that are executed to test an implementation. A TCK can also include documentation that includes the specific TCK usage procedures, and the compatibility testing requirements that apply to the related technology release (usually in the form of a TCK user's guide). Also, a description of the TCK appeals process can be included, as well as an audit process, which is used to better ensure the integrity of a consistent self-testing compatibility program.

As mentioned above, a TCK usually includes a TCK test suite, which is a set of tests designed to verify that an implementation of a Java technology complies with the appropriate specification. Each test in a TCK test suite is composed of one or more test cases that are designated by a test description. A test case is the source code and accompanying information designed to exercise one aspect of a specified assertion. Accompanying information may include test documentation, auxiliary data files and other resources used by the source code.

In order to be complete, a test suite includes a test case to verify each and every testable assertion that is made by the API specification. Test developers must review the actual specification document and generate at least one test case for each testable assertion that appears in the API specification.

Unfortunately, the conventional method for determining assertions for a particular specification is a laborious process involving a manual inspection of the specification. Prior to the test design stage during conventional testing, the test developer must scan through the specification and split the entire text into logical statements. Each logical statement then needs to be examined by type to indicate if it is a testable assertion.

Of course, the process of manually inspecting the specification is a time consuming process prone to errors. Moreover, since one of the most important issues of the TCK development process is to keep TCK tests synchronized with their technology's current API specification, the manual inspection process is exacerbated whenever the specification changes. Upon any specification change, the corresponding TCK tests must be revised and corrected if their functionality has been affected by the change. To accomplish this, the specification must be re-inspected to confirm the current assertions and determine if particular assertions should be removed or additional assertions should be added.

In view of the foregoing, there is a need for methods for tracking the specification to determine assertions. Preferably, the methods should be automated, and should provide tracking between different versions of a specification to identify TCK test that are affected by each change assertion.

SUMMARY OF THE INVENTION

Broadly speaking, the present invention fills these needs by providing a system for tracking a specification that automatically obtains assertions within the specification. The embodiments of the present invention further provide tracking between different versions of a specification, and also determine test coverage of a specification. In one embodiment, a method for collecting information on a specification of a computer program is disclosed. A plurality of classes is provided, where each class is capable of performing a particular task related to obtaining information from a specification. Then a command is received from a user. The command requests a particular task to be performed. A class is then selected from the plurality of classes based on the task requested by the received command, and the selected class is run. In this manner, information on the specification is obtained. The plurality of classes can include a get assertion class that obtains assertions from the specification, and in some embodiments, the get assertion class can be used to obtain a list of assertions from the specification. The plurality of classes can also include a reporting class that provides information on test coverage of the specification. The information on test coverage of the specification can comprise a list of assertions that are tested by specification tests, and optionally, can comprise a percentage of the assertions obtained from the specification that are tested by specification tests.

In another embodiment, a computer program for obtaining assertions from a specification for a computer program is disclosed. As mentioned above, an assertion is a testable statement within the specification. The computer program includes a code segment that receives an input specification for a computer program, and a code segment that identifies a context within the input specification. Further included is a code segment that parses the identified context to obtain assertions, and a code segment that adds the obtained assertions to an assertion result set. The assertion result set can then be used to facilitate testing of the specification. Optionally, a code segment that filters the identified context prior to parsing the context can be included. Also optionally, the computer program can obtain assertions, which are implied statements that can be tested. Further, each assertion can comprise at least one sentence of the specification.

In yet a further embodiment, a computer program is disclosed for collecting information on a specification of a computer program. The computer program includes a plurality of classes, wherein each class is capable of performing a particular task related to obtaining information from a specification, and a code segment that receives a command from a user. The command requests a particular task to be performed. Further included is a code segment that selects a class from the plurality of classes based on the task requested by the received command, and a code segment that runs the selected class, whereby information on the specification is obtained.

Advantageously, the embodiments of the present invention allow a test developer to perform testing routines in a semi-automated way that improves performance, reduces human error, and allows the test developer to spend more time on test development itself. Moreover, as described in greater detail subsequently, the embodiments of the present invention produce various reports on how TCK covers the corresponding specification. These reports are very useful for project management since they allow the test developer to analyze TCK completeness and plan future TCK works. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a specification tracking method for use during compatibility testing. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The embodiments of the present invention allow quick collection of information on a specification, the corresponding test suite, and the relationship between the specification and the test suite. Thus, the embodiments of the present invention simplify the TCK Test Development process. In particular, the embodiments of the present invention automatically identify assertions, track changes between specification versions, and identify TCK tests that are affected by each changed assertion.

As mentioned previously, test developers had to perform these routines manually. Advantageously, the embodiments of the present invention allow a test developer to perform these routines in a semi-automated way that improves performance, reduces human error, and allows the test developer to spend more time on test development itself. Moreover, as described in greater detail subsequently, the embodiments of the present invention produce various reports on how TCK covers the corresponding specification. These reports are very useful for project management since they allow the test developer to analyze TCK completeness and plan future TCK works.

The specification tracking of the embodiments of the present invention bind a specification assertion to the test that tests that specification assertion. After that binding is done a plurality of benefits is gained. First, upon each change in the specification assertion, the corresponding set of TCK tests can be tracked. This helps the test developer to identify a set of the tests that should be revised as soon as new specification version is available.

Second, the embodiments of the present invention provide different types of reports regarding how the TCK covers the corresponding specification. These reports include coverage information, which defines how many specification assertions are tested by the testsuite, and a list of tested and untested assertions. Third, the embodiments of the present invention keep binding information, which is the correspondence between a test case and an assertion.

Figure 1:
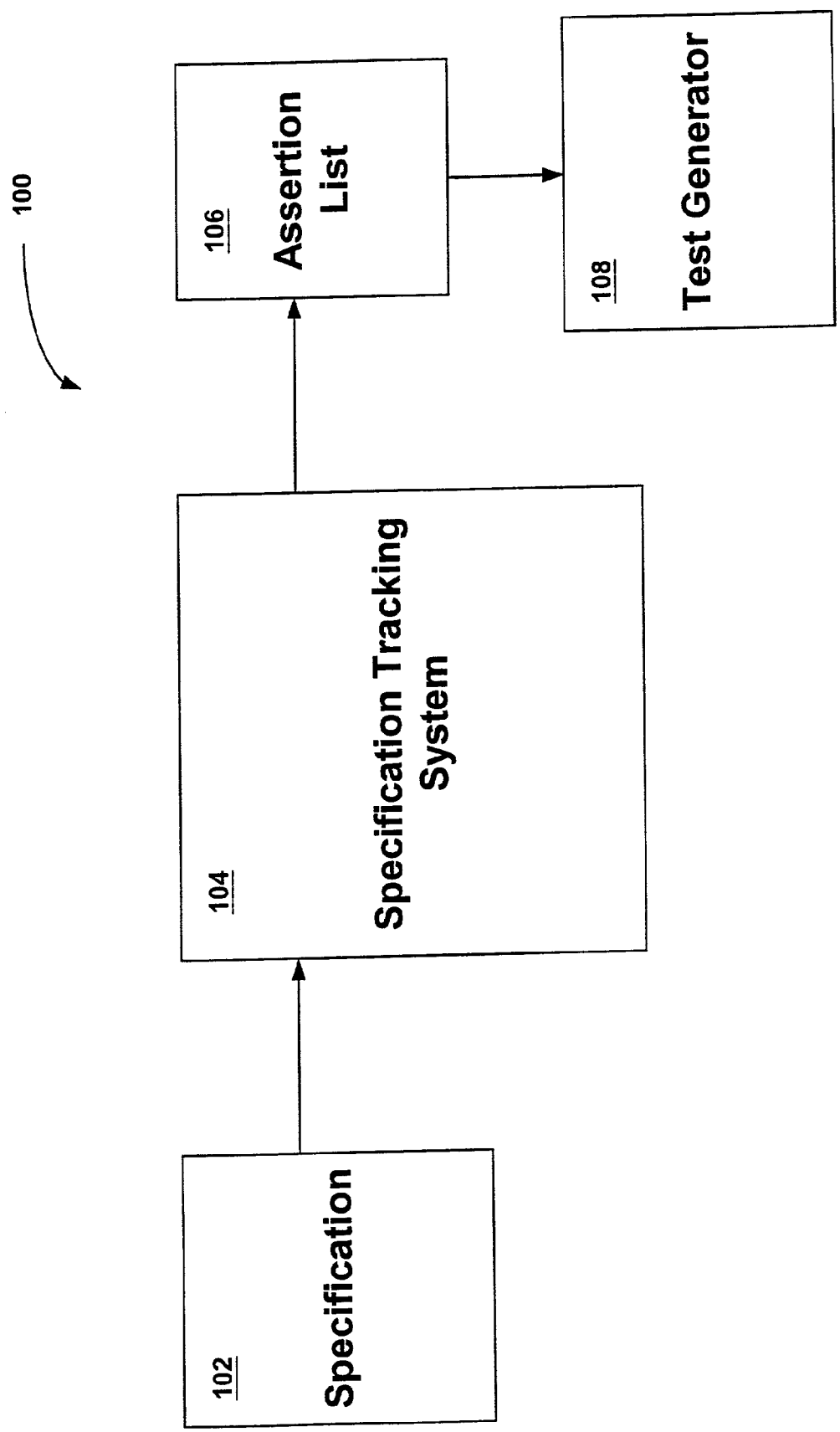
FIG. 1 is diagram showing a specification tracking methodology, in accordance with an embodiment of the present invention.

FIG. 1 is diagram showing a specification tracking methodology 100, in accordance with an embodiment of the present invention. The specification tracking methodology 100 shows a specification 102, a specification tracking system 104, an assertion list 106, and a test generator 108. The specification 102 can be any specification, such as a Javadoc specification for a Java technology API. Preferably, the specification 102 includes a plurality of assertions that can be tested.

In operation, the specification 102 is provided to the specification tracking system 104 of the embodiments of the present invention. Once received, the specification tracking system 104 processes the specification to generate an assertion list 106. The assertion list 106 can then be used to create test cases manually, or automatically using a test generator 108. In addition, the specification tracking system 104 generates reports providing information on how the TCK tests cover the specification, as described in greater detail subsequently. These reports can include information on the percentage of the specification assertions covered by the TCK tests, a list of assertions tested by the TCK tests, and a list of assertions not tested by the TCK tests.

In one embodiment, the specification tracking system 104 is generated using the Java language and executed on a Java virtual machine. A Java virtual machine is used as an interpreter to provide portability to Java applications. In general, developers design Java applications as hardware independent software modules, which are executed using Java virtual machines. The Java virtual machine layer is developed to operate in conjunction with the native operating system of the particular hardware on which the mobile multimedia framework system is to run. In this manner, Java applications can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result. Although the present invention is described based on the Java programming language, other programming languages may be used to implement the embodiments of the present invention, such as other object oriented programming languages.

Figure 2:
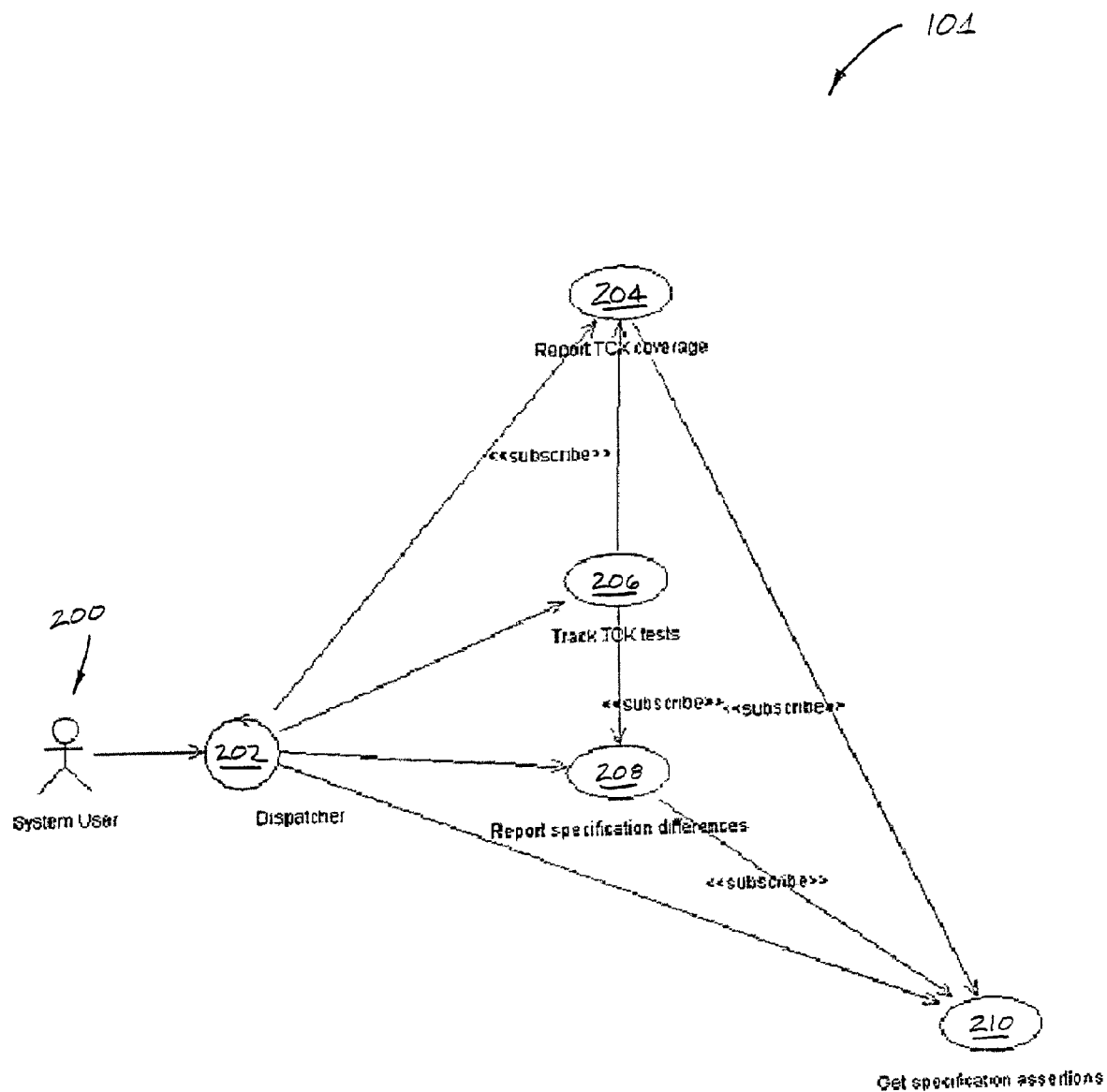
FIG. 2 is a use case diagram showing a specification tracking system, in accordance with an embodiment of the present invention.

FIG. 2 is a use case diagram showing a specification tracking system 104, in accordance with an embodiment of the present invention. The use case diagram of FIG. 2 illustrates how a user 200 interacts with a specification tracking system 104 of the embodiments of the present invention. The specification tracking system 104 includes a dispatcher module 202 in communication with report TCK coverage module 204, a track TCK tests module 206, a report specification differences module 208, and a get specification assertions module 210. As will be seen, the specification tracking system 104 of the embodiments of the present invention is capable of performing a plurality of tasks, including obtaining specification assertions, reporting TCK information, tracking specification differences, and determining TCK tests testing a particular assertion.

In operation, the user 200 interacts with the dispatcher module 202, which hides the internal organization of the specification tracking system 104 details from the user 200. The dispatcher module 202 provides the user 200 with simple and intuitive interface to execute the underlying tasks. The user 200 submits a command to the dispatcher module 202, and the dispatcher module 202 makes a decision based on the received command as to which concrete actions it should perform depending on the system configuration and default settings.

The dispatcher module 202 preferably is not aware of any task-specific details. Based on the commands submitted by the user 200, the dispatcher module 202 determines the class responsible for executing specified task and runs it. This class will be referred to hereinafter as the "responsible class."

Each of the responsible classes implements a special interface that provides the dispatcher module 202 with a uniform interface to run the task. In one embodiment, a specification tracking framework application programming interface (API) is used to implement the uniform interface. The framework API specifies which interfaces classes should expose, and how to use these interfaces. In addition, the framework API determines the protocols used, which is the method calling sequence.

Figure 3:
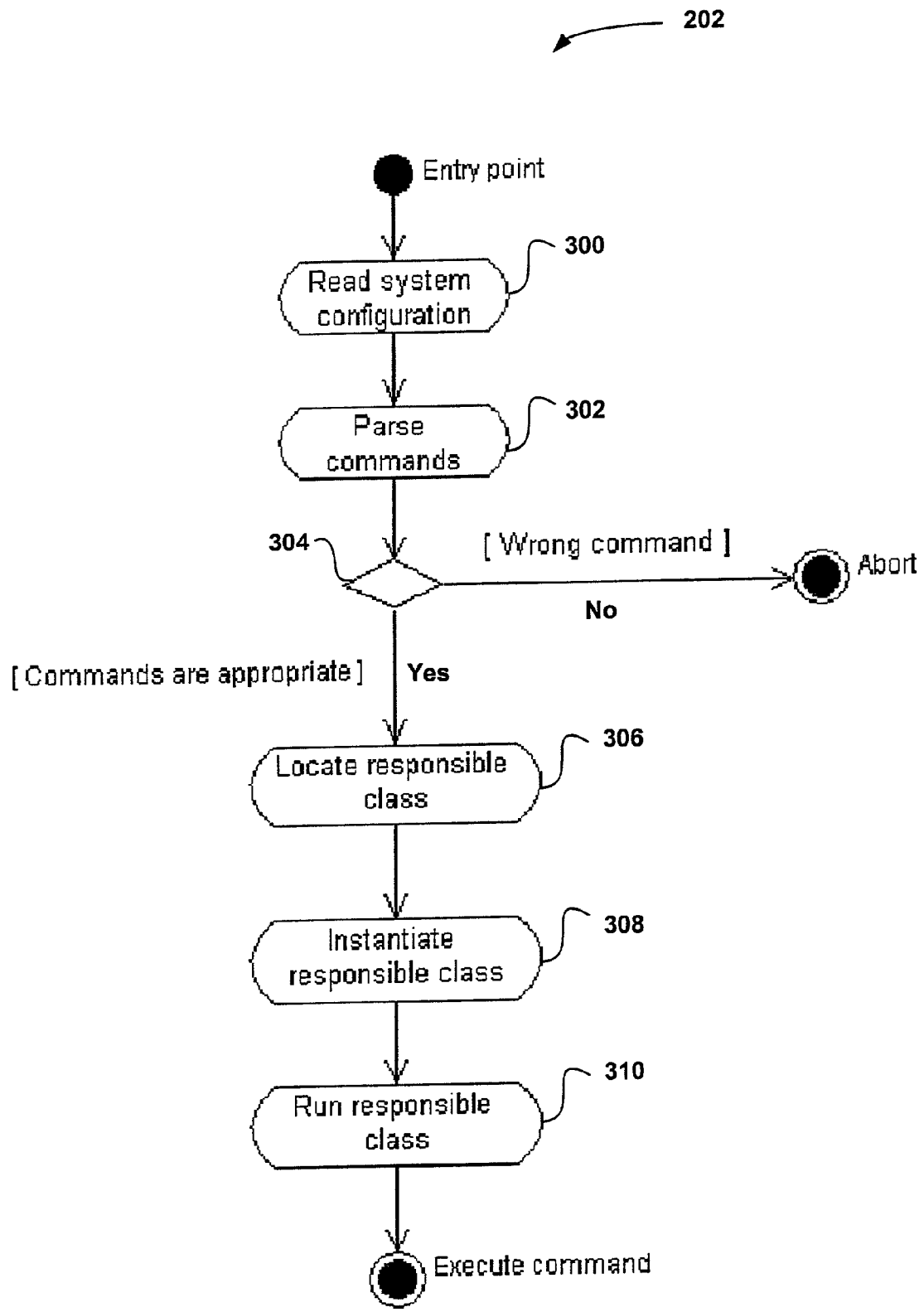
FIG. 3 shows dispatcher process for processing user commands, in accordance with an embodiment of the present invention.

FIG. 3 shows dispatcher process 202 for processing user commands, in accordance with an embodiment of the present invention. The dispatcher module 202 forms the entry point of specification tracking system of the embodiments of the present invention. The user submits a command to the dispatcher module 202 through the entry point, and the dispatcher module 202 reads the system configuration in operation 300. In addition, the dispatcher module parses the command submitted by the user in operation 302. In one embodiment, the syntax for the command can be:

java com.sun.tdk.spectrac.Main command [doctype] [options]

Where command is one of the following: 1) getassert, 2) report, 3) specdiff, or 4) track. In addition, doctype is type of specification to be processed, and options are command-specific options.

A decision is then made as to whether the command is appropriate for the current implementation of the specification tracking system, in operation 304. For example, if the specification tracking system were implemented as described above with reference to the syntax for a command, a command other than 1) getassert, 2) report, 3) specdiff, or 4) track, would not be appropriate. If the command is not appropriate the dispatch process 202 aborts, otherwise, the dispatch process continues with operation 306.

In operation 306, the dispatcher module 202 locates the responsible class for executing the received command. Each task has a responsible class, which is responsible for performing the functions of the task. After parsing the command received from the user, the dispatcher module can determine which class is responsible for executing the functions of the related task.

The responsible class is then instantiated in operation 308. Instantiation is a term used in object oriented programming to describe the creation of objects from classes. An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

Figure 4:
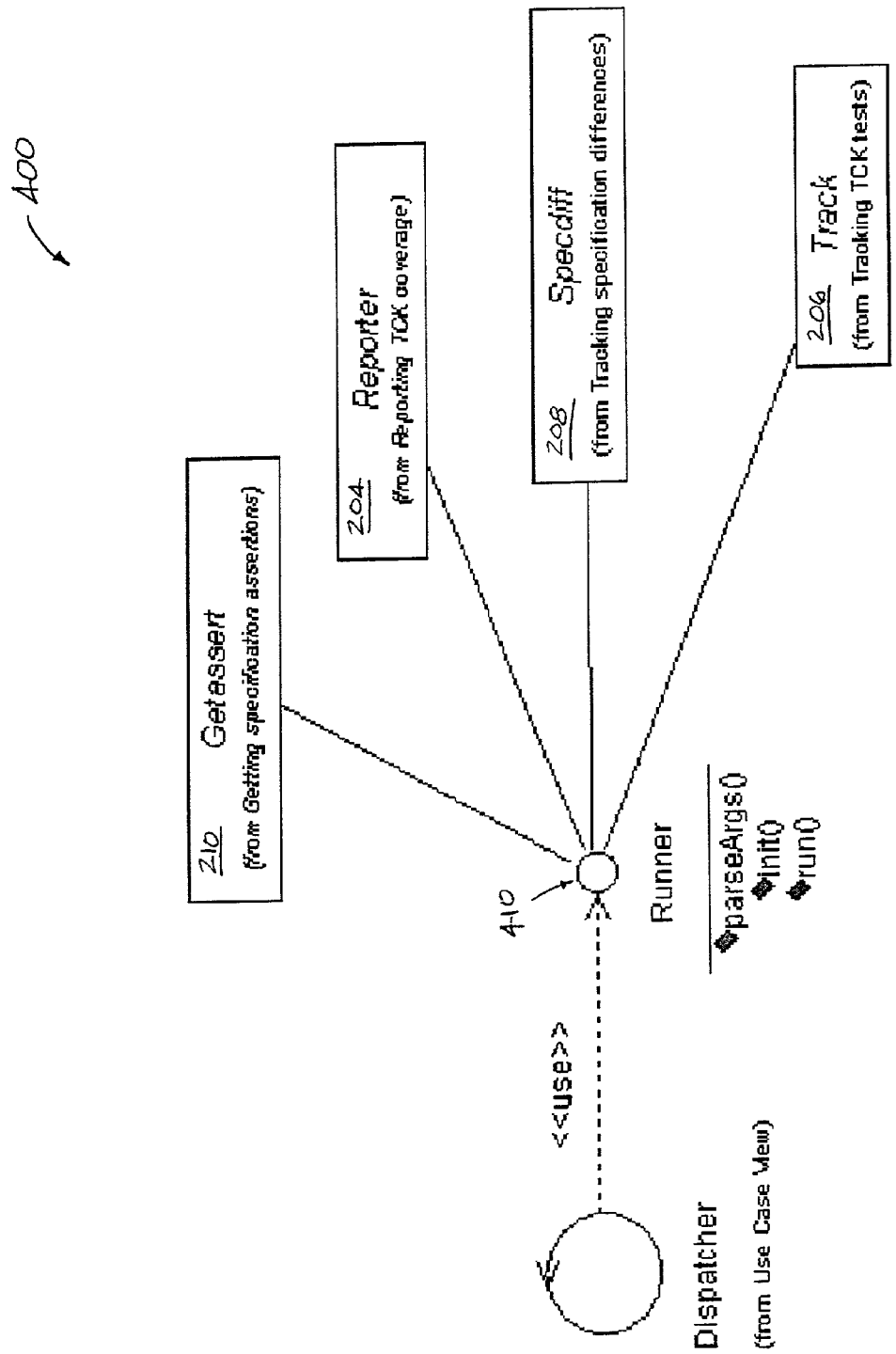
FIG. 4 is a block diagram showing task entry points, in accordance with an embodiment of the present invention.

In operation 310, the responsible class is run and the command is executed. Each task has its responsible class, which is the entry point for that task. FIG. 4 is a block diagram showing task entry points 400, in accordance with an embodiment of the present invention. The task entry points 400 include getassert 210, reporter 204, specdiff 208, and track 206, based on the command types described previously. As shown in FIG. 4, the dispatcher module uses a runner 410 to parse the commands, and instantiate and run the responsible classes.

Each responsible class exposes a uniform interface that allows the Dispatcher to execute a task without knowledge of any task-specific details. In this manner, the implementation that is being called by the dispatcher module may be modified without any affect on dispatcher module's code.

Figure 5A:
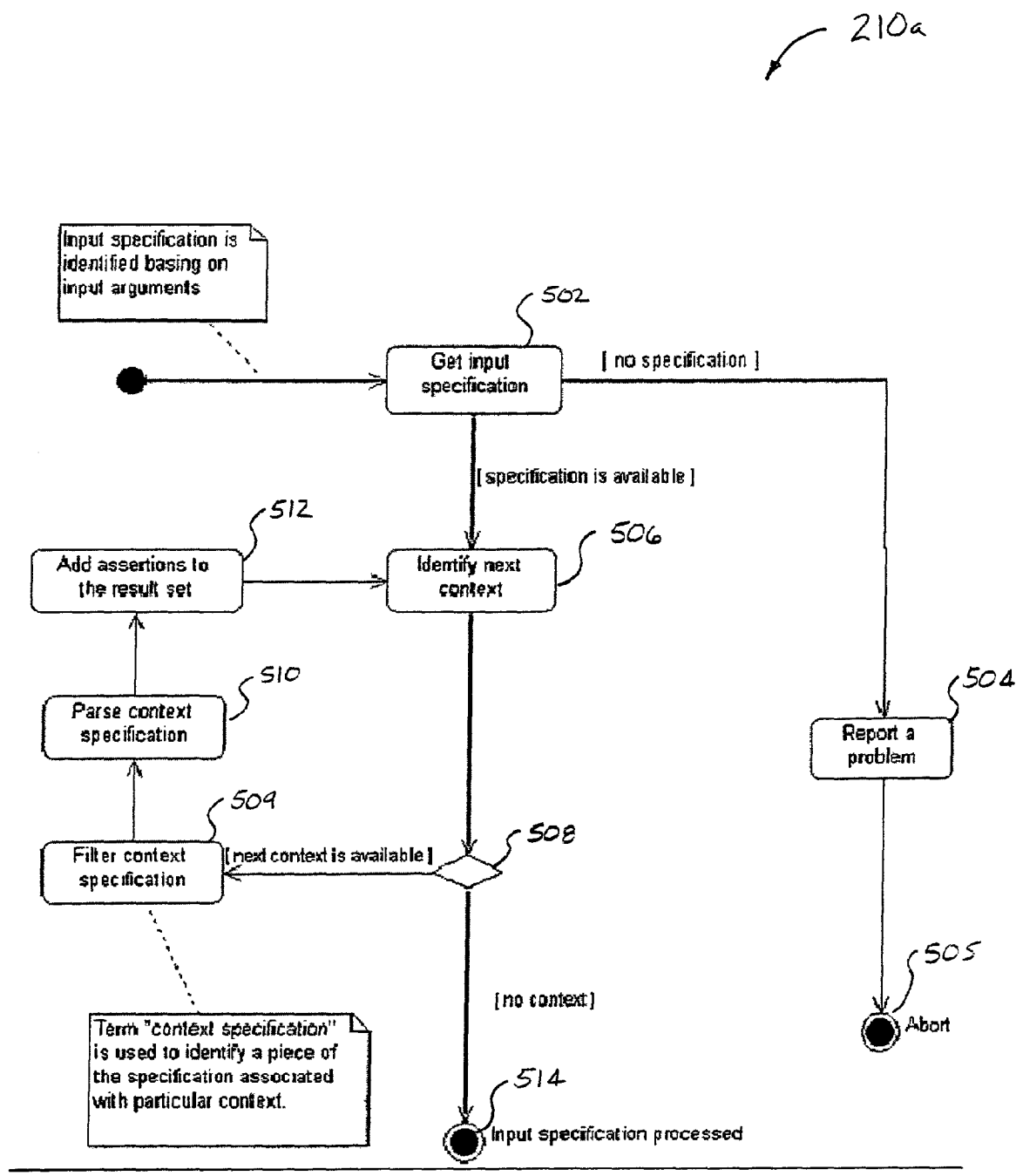
FIG. 5A is flowchart showing a process for obtaining specification assertions, in accordance with an embodiment of the present invention.

FIG. 5A is flowchart showing a process 210a for obtaining specification assertions, in accordance with an embodiment of the present invention. As will be seen, a user can retrieve specification assertions using the getassert command of the specification tracking system. The getassert command has the corresponding abstract class GetassertBase, which is the base class for every class implementing getassert command.

In operation 502, the process 210a receives an input specification. As discussed above, the input specification can be identified based on the input arguments of the received command. After receiving a request to process a particular specification, the process 210a determines whether or not the requested specification is available. If the requested specification is not available, a problem is reported in operation 504, and the process 210a is aborted, in operation 505. However, if the requested specification is available, the process 210a continues with operation 506.

In operation 506, the next context is identified. The context is a set of circumstances related to each assertion. As such, each assertion of the specification has its context. In one embodiment of the present invention, the specification has a tree-like structure. For example, the API specification tree has a top-level specification as a root, and package-level specifications as immediate children of the root, with class-level specifications as their children, and finally constructor/method/field specifications as leaves. As mentioned previously, an assertion is uniquely identified by both the assertion text and the context associated with it. The assertion context can be defined as the associated node of the specification tree. For example, an assertion from a package-level specification would mean that the package-level is the assertion context. It should be noted, however, that embodiments of the present invention can process specifications that do not strictly adhere to this particular multi-level structure, because the specification tree can be considered to contain only one node.

A decision is then made, in operation 508, as to whether a context is available. If no context is available, the process 210a is completed in operation 514. Generally, when no further context is available the input application has been processed and an assertion result completed, as described below. If the context is available, the process 210a continues with operation 509.

The context specification is then filtered, in operation 509. A context specification is a portion of the specification that is associated with a particular context. Once the context specification is filtered, the context specification is parsed, in operation 510. Specifically, the context specification is parsed to find the assertions present in the particular context specification.

The embodiments of the present invention scan through the specification and split the entire text into logical statements. In some embodiments, discussed subsequently, each logical statement is then examined by type to indicate if it is a testable assertion.

Statements are considered testable assertions if they are intended to describe behavior of an API that can be tested by the TCK. Also, examples or sample code pieces that are provided in the specification are typically testable and can be verified by the TCK. In this sense, examples or sample code are generally considered testable assertions. Further, it should be noted that some assertions can be implied or indirectly stated in the specification, and these should be identified as well for testing. Note that an implied assertion might also introduce a specification flaw that may not be obvious.

On the other hand, statements intended to describe the behavior of an API, but which cannot be tested by the TCK due to the special nature of the behavior or functionality, are generally considered non-testable assertions. Similarly, some statements will form general descriptions of the API such as a description of a package, class, method, or field, and so forth. If such a general description does not describe behavior, but is aimed rather at providing a context for the rest of the text, then such a statement is not intended to be an assertion and should not be tested. Hence, these statements are generally not considered to be assertions, as they are easy to misinterpret.

An exemplary context specification is shown in Table 1.

TABLE 1 public static String toString(int i, int radix)
Creates a string representation of the first argument in the radix specified by the second argument.
If the radix is smaller than Character.MIN_RADIX or larger than Character.MAX_RADIX, then the radix 10 is used instead.
If the first argument is negative, the first element of the result is the ASCII minus character '−' ('\u002d').
If the first argument is not negative, no sign character appears in the result.
Parameters:
i - an integer.
radix - the radix.
Returns:
a string representation of the argument in the specified radix.
See Also:
Character.MAX_RADIX, Character.MIN_RADIX Table 2 shows a list of assertions based on the context specification shown in Table 1.

TABLE 2

| | |
|---|---|
| A1. | Creates a string representation of the first argument in the radix specified by the second argument. |
| A2. | If the radix is smaller than Character.MIN_RADIX or larger than Character.MAX_RADIX, then the radix 10 is used instead. |
| A3. | If the first argument is negative, the first element of the result is the ASCII minus character '−' ('\u002d'). |
| A4. | If the first argument is not negative, no sign character appears in the result. |

Thus, tables 1 and 2 illustrate one example of how an embodiment of the present invention can parse a context specification and create a list of assertions based on that context specification.

Having parsed the context specification, the discovered assertions are added to an assertion result set, in operation 512. The process 210a then continues with another identify context operation 506. In this manner, the process 210a can parse through an input specification and generate a list of assertions based on the input specification. As mentioned above, in some embodiments of the present invention, each logical statement is can be examined by type to indicate if it is a testable assertion.

Figure 5B:
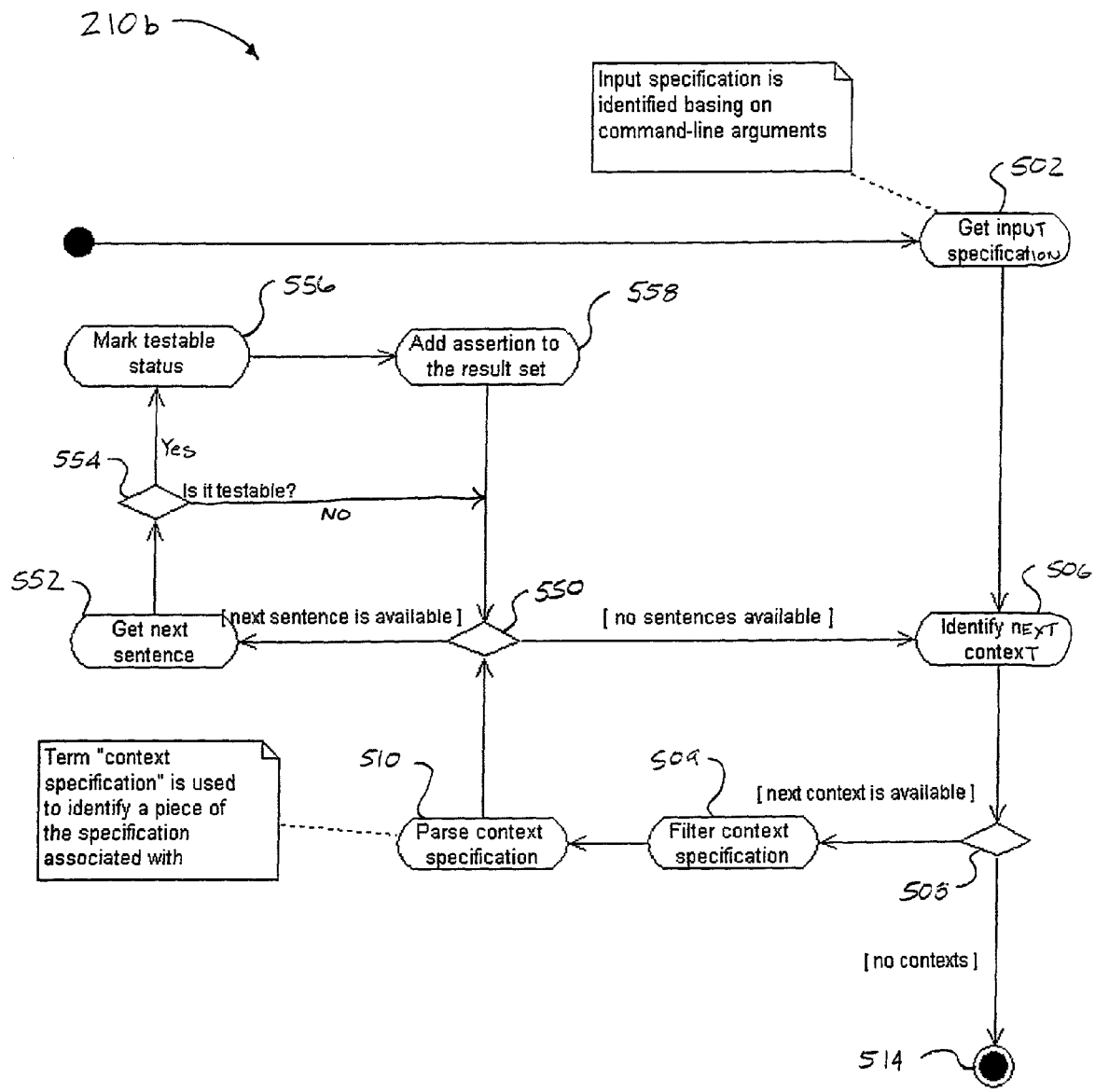
FIG. 5B is flowchart showing a process for obtaining specification assertions and validating the assertions, in accordance with an embodiment of the present invention.

FIG. 5B is flowchart showing a process 210b for obtaining specification assertions and validating the assertions, in accordance with an embodiment of the present invention. Similar to the process 210a of FIG. 5A, in operation 502 of process 210b an input specification is received. As discussed above, the input specification can be identified based on the input arguments of the received command.

In operation 506, the next context is identified. A decision is then made, in operation 508, as to whether a context is available. If no context is available, the process 210b is completed in operation 514. Generally, when no further context is available the input application has been processed and an assertion result completed. If the context is available, the process 210b continues with operation 509.

The context specification is then filtered, in operation 509. As discussed above, a context specification is a portion of the specification that is associated with a particular context. Once the context specification is filtered, the context specification is parsed, in operation 510. Specifically, the context specification is parsed to find the assertions present in the particular context specification.

A decision is then made as to whether a sentence is available, in operation 550. Embodiments of the present invention can parse the input specification to obtain sentences having relevance to the input specification. If no sentence is available in the current context, the process 210b identifies the next context in 506. Otherwise, the process obtains the next sentence, in operation 552.

Another decision is then made as to whether the obtained sentence is a testable assertion, in operation 554. In one embodiment, a natural language processing system can be used to process the obtained sentence. In this case, the natural language processing system includes an input means for inputting the sentence obtained from the specification, and a knowledge base for storing linguistic knowledge and general knowledge. In addition, a partitioner is included that partitions the sentence into words, and a derivation module is included that refers to knowledge stored in the knowledge base and derives concepts respectively represented by the words obtained by the partitioner. Further, an integration module can be included that relates the concepts of the words, which are derived by the derivation module, with one another by referring to knowledge stored in the knowledge base. For example, a valid assertion can be identified as a sentence which uses particular keywords or phrases such as "required to" "should", "should not".

If the obtained sentence is not a testable assertion, another decision is made as to whether another sentence is available in the current context, in operation 550. However, if the obtained sentence is a testable assertion, sentence is marked as a valid, testable assertion, in operation 556. The assertion is then added to the assertion result set, in operation 558. Thereafter, another decision is made as to whether another sentence is available in the current context, in operation 550. In this manner, the process 210b can parse through an input specification and generate a list of valid assertions based on the input specification.

Figure 6:
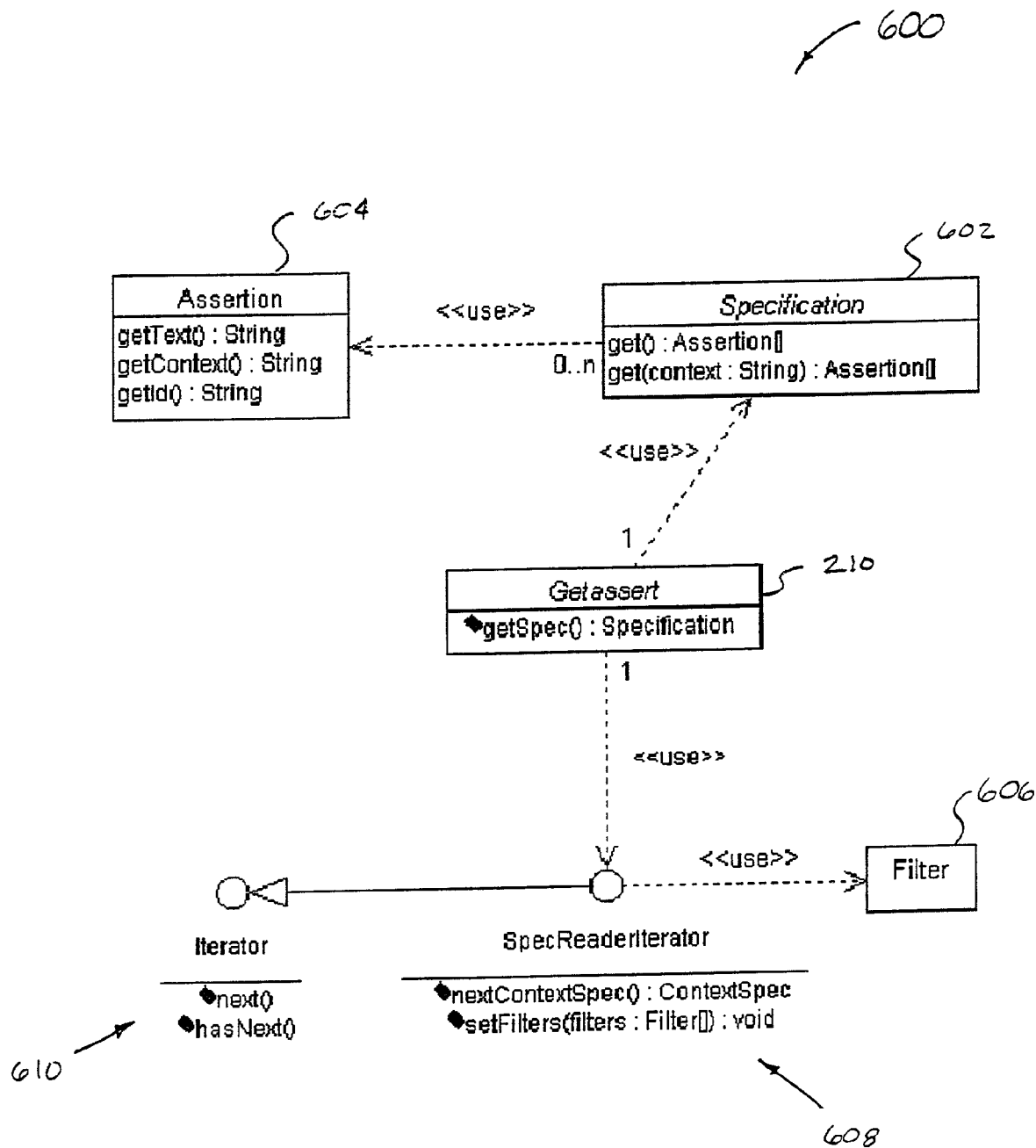
FIG. 6 is a class diagram showing a Getassert framework class, in accordance with an embodiment of the present invention.

FIG. 6 is a class diagram showing a Getassert framework class 600, in accordance with an embodiment of the present invention. The Getassert framework class 600 of FIG. 6 shows the Getassert class 210, a specification class 602, and an assertion class 604. As shown in FIG. 6, the Getassert class 210 calls the methods of the specification class 602 to obtain context specifications and the related assertions. The specification class 602, in turn, uses the assertion class 604 to obtain the sentences within each context specification.

As shown in FIG. 6, a Spec Reader Iterator 608 is used to retrieve the specification. The Spec Reader Iterator 608 is responsible for obtaining the specification text from the specified source, determining the contexts, preprocessing the specification text, and providing an interface to iterate through the various contexts and their specifications. The responsible class, Getassert 210, iterates through the documentation and creates an internal representation of the input specification. The Getassert class 210 provides the public method Specification getSpec( ) which is used by other components of the specification tracking system or an external application to get an instance of Specification class.

Figure 7:
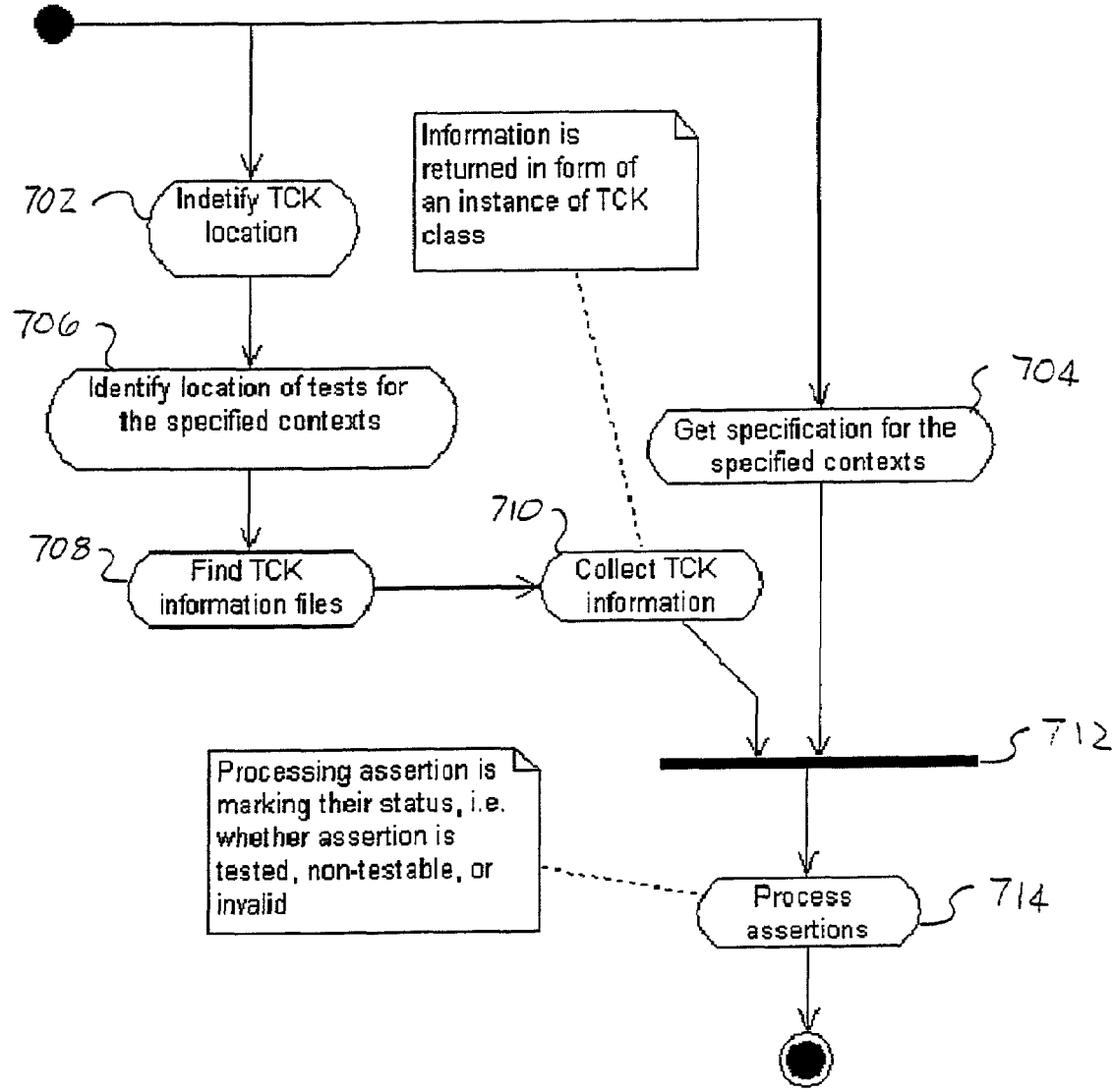
FIG. 7 is a flowchart showing a process 204 for reporting TCK coverage of a specification, in accordance with an embodiment of the present invention.

FIG. 7 is a flowchart showing a process 204 for reporting TCK coverage of a specification, in accordance with an embodiment of the present invention. In operation 702, the location of the TCK is identified. In addition, the specification for the specified contexts can be obtained in operation 704.

Once the TCK location is identified, the location of the tests for the specified contexts is identified, in operation 706. Next, the TCK information files are located, in operation 708, and the TCK information is collected in operation 710. Typically, the information is returned in the form of an instance of the TCK class. At point 712, both the TCK information and the specification for the specified contexts that was obtained in operation 704 are available to the system. Thereafter the assertions are processed, in operation 714. Processing the assertions includes marking the assertion status, such as indicating whether an assertion is tested, non-tested, or invalid. To perform the process 204 for reporting TCK coverage of a specification, the TCK information class 204 is used.

Figure 8:
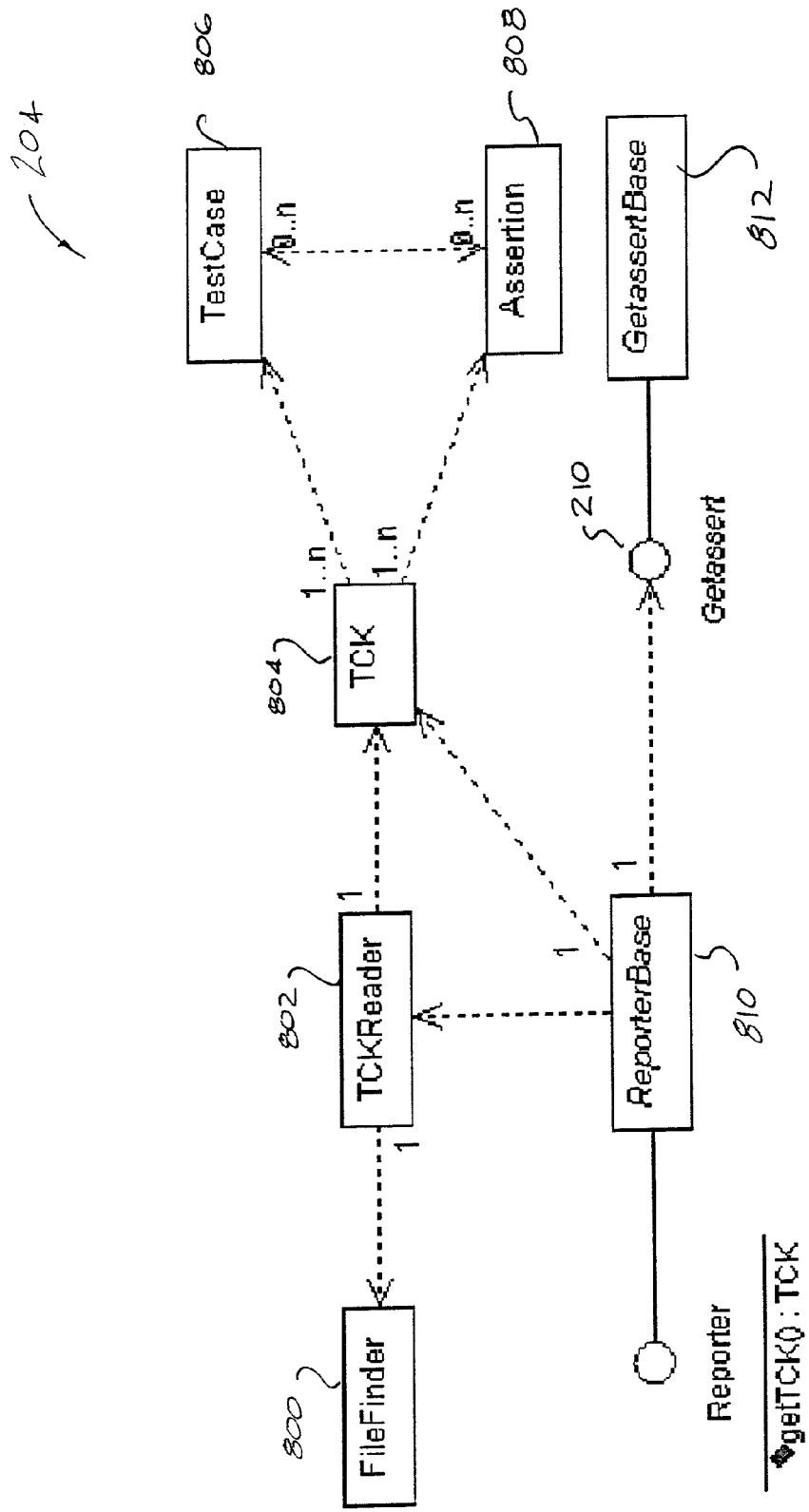
FIG. 8 is a diagram showing reporting TCK information class, in accordance with an embodiment of the present invention.

FIG. 8 is a diagram showing reporting TCK information class 204, in accordance with an embodiment of the present invention. The TCK information class 204 includes a FileFinder module 800, a TCKReader module 802, a TCK 804, a TestCase 806, an Assertion 808, a ReporterBase 810, and a GetassertBase 812. Generally, before reports are created the TCK information files describing test-to-assertion relationship are created. The TCKReader module 802 uses the FileFinder module 800 to find these files for a set of contexts specified. The TCKReader module 802 typically collects TCK information by reading information files and provides this information to the Report class in form of an instance of TCK object 804. The Report class then gets the actual specification using the Getassert interface 210 and compares this with the information contained in the TCK 804. The output from this operation is still a TCK object with each assertion 808 marked with its status. A method Report.run( ) is then executed that reads that information and creates human-readable reports.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer program on a computer readable storage medium for specification compatibility tracking for a software product, comprising:

a code segment that associates testable assertions with statements within an input specification;

a code segment that associates a context with each of the testable assertions, wherein the input specification has a multi-level tree structure having a plurality of nodes, each of the statements being contained by one of the nodes, wherein the context for each of the testable assertions is defined as the node containing the statement associated with the testable assertion;

a code segment that binds each of the testable assertions to one of a plurality of tests that test the testable assertion, each one of the tests being a computer program testing an implementation of the software product to determine whether the software product compiles with the portion of the input specification that corresponds with the testable assertion bound to the one of the tests;

a code segment that identifies each testable assertion as tested, non-tested, or invalid; and a code segment for presenting information on coverage of the input specification by tests.

2. The computer program of claim 1, wherein the information includes a percentage of the testable assertions covered by the tests.

3. The computer program of claim 1, wherein the information includes a list of the testable assertions tested by the tests.

4. The computer program of claim 1, wherein the information includes a list of the testable assertions not tested by the tests.

5. The computer program of claim 1, further comprising:

a code segment identifying ones of the testable assertions affected by a change to the input specification.

6. A method for specification compatibility tracking for a software product, comprising:

associating testable assertions with statements within an input specification;

associating a context with each of the testable assertions, wherein the input specification has a multi-level tree structure having a plurality of nodes, each of the statements being contained by one of the nodes, wherein the context for each of the testable assertions is defined as the node containing the statement associated with the testable assertion;

binding each testable assertion to one of a plurality of tests that test the testable assertion, each one of the tests being a computer program testing an implementation of the software product to determine whether the software product complies with the portion of the input specification that corresponds with the testable assertion bound to the one of the tests;

identifying each testable assertion as tested, non-tested, or invalid; and presenting information on coverage of the input specification by tests.

7. The method of claim 6, wherein the information includes a percentage of the testable assertions covered by the tests.

8. The method of claim 6, wherein the information includes a list of the testable assertions tested by the tests.

9. The method of claim 6, wherein the information includes a list of the testable assertions not tested by the tests.

10. The method of claim 6, further comprising:

identifying ones of the testable assertions affected by a change to the input specification.

11. The computer program of claim 1 wherein the tree structure comprises a top-level specification, package-level specifications as immediate children of the top level specification, class-level specifications as children of the package-level specifications, and leaves comprising one or more of a constructor specification, a method specification, and a field specification, each of the top-level specification, package-level specification, class-level specification and leaves being identifiable as one of the nodes in the tree-like structure.

12. The method of claim 6 wherein the tree structure comprises a top-level specification, package-level specifications as immediate children of the top level specification, class-level specifications as children of the package-level specifications, and leaves comprising one or more of a constructor specification, a method specification, and a field specification, each of the top-level specification, package-level specification, class-level specification and leaves being identifiable as one of the nodes in the tree-like structure.

* * * * *